United States Patent
Hurley, III et al.

(10) Patent No.: US 7,376,478 B2
(45) Date of Patent: May 20, 2008

(54) ACHIEVING PERCEIVED RELIABILITY FOR REPAIRABLE SYSTEMS

(75) Inventors: Robert Peter Hurley, III, Streamwood, IL (US); Vinod Kumar Chopra, Lake Barrington, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 204 days.

(21) Appl. No.: 11/385,617

(22) Filed: Mar. 21, 2006

(65) Prior Publication Data

US 2007/0225845 A1     Sep. 27, 2007

(51) Int. Cl.
*G06F 19/00*   (2006.01)
*G06F 11/30*   (2006.01)

(52) U.S. Cl. .................. 700/97; 700/106; 702/182

(58) Field of Classification Search .................. 700/97, 700/106; 702/182; 714/1
See application file for complete search history.

(56) References Cited

U.S. PATENT DOCUMENTS 7,272,516 B2 * 9/2007 Wang et al. .................. 702/60

OTHER PUBLICATIONS

D. David Dylis & Mary Gossin Priore. "A Comprehensive Reliability Assessment Tool for Electronic Systems". Reliability and Maintainability Annual Symposium (2001): 308-313.*

Christopher L. Smith & Jerry B. Womack, Jr. "Raytheon Assessment of PRISM as a Field Failure Prediction Tool". Reliability and Maintainability Annual Symposium (2004): 37-42.*

* cited by examiner

*Primary Examiner*—Ryan A Jarrett
(74) *Attorney, Agent, or Firm*—Peter Kendall

(57) ABSTRACT

A method to achieve perceived reliability for repairable systems including goal setting of different phases of the product life cycle. The method includes consideration of a plurality of product life cycle phases to determine a plurality of failure rate multipliers which are transformed to mean time between failures multipliers and normalized. Using these computed mean times between failures multipliers and a chosen level of customer use, the box-of-parts required mean time between failures level can be calculated. Also, the required mean time between failures for design, manufacturing, infant mortality, and service phase of product life cycle can be computed.

19 Claims, 1 Drawing Sheet

ACHIEVING PERCEIVED RELIABILITY FOR REPAIRABLE SYSTEMS

FIELD OF THE INVENTION

The present invention relates to goal setting and allocation requirements in product development; and more specifically to goal setting and allocation requirements for repairable systems to achieve desired reliability as measured by market expectations.

BACKGROUND OF THE INVENTION

In design and manufacturing of a product, the performance and life expectancy have played a crucial role in what components are selected along with their reliability characteristics. Since most products have an eventual customer that will be using the product, the overall reliability of product is often based on customer needs, market expectation, or other similar based measures of end user reliability standards. Often, a manufacturer will desire to test the given product so a manufacturing reliability level is set to perform production acceptance testing of the product.

Once a particular goal is set then the individual subsystem and component reliability levels are set to meet the overall design goal. These reliability criteria are designed to allow for selection of the sub-systems or components based on criteria that will allow the design to perform to specification. However, the actual customer usually does not get the same level of performance as the design criteria suggested. This is caused by various sources during the product life cycle that occur after the selection of sub-systems or components.

The product life cycle downstream of the selection of the sub-systems or components is often affected by additional losses of performance. Some of these losses include skill level used in the manufacturing of the final product and other organizational constraints during manufacturing. Other downstream areas that can be considered are installation, warranty service, customer use (including misuse and/or abuse), and planned or unplanned maintenance. These factors typically play a larger role in the measured and perceived reliability for repairable systems than system design parameters. Such factors, however, are not taken into account when setting overall system reliability goals. Therefore, there remains a need for improvement of the setting of reliability targets of a product based on actual customer experiences and expectations.

SUMMARY OF THE INVENTION

In at least one embodiment, the present invention takes the form of a method that accounts for the customer needs while also considering process losses to determine the sub-system and component reliability. The method/system comprises (i.e., includes, but is not necessarily limited to) determining process losses based on organization and culture with one example being that of Reliability Analysis Center's (RAC) PRISM process grade factors (PGF). PRISM is a software tool used for prediction of system reliability. While these factors are used for purposes of explanation of the inventive concepts, other more organizational specific factors may be considered as required to implement the method. In another step, the "box-of-parts" reliability is determined using nominal reliability of the system parts themselves without any process losses. The processes losses are then computed for each phase of the PLC (Product Life Cycle) individually and the impact to the failure rate multiplier is recorded.

In a preferred embodiment, the inverse of the failure rate multiplier is taken to give a mean time between failure (MTBF) multiplier. Then, the PLC phase MTBF multipliers are normalized so that the box-of-parts MTBF multiplier is 1. Next, a customer MTBF requirement is specified. A back computation is used to determine the MTBF for the "box-of-parts." Thus, the selection of a box-of-parts including sub-systems and components that meet this criteria will allow for meeting the customer needs while considering the process losses.

DETAILED DESCRIPTION OF THE INVENTION

Figure 1:
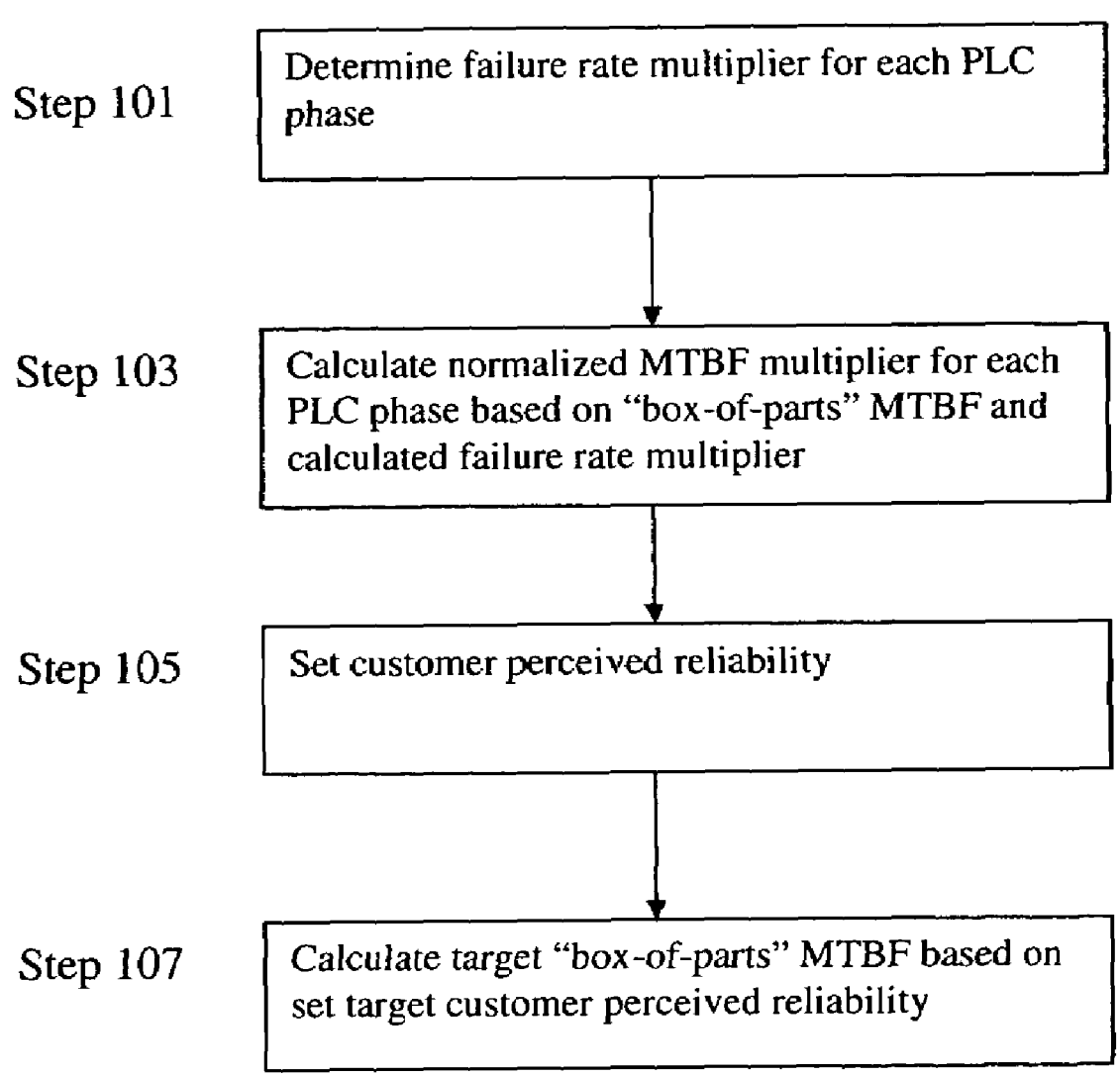
FIG. 1 is a process flow diagram illustrating a method for determining system reliability target goals in accordance with a preferred embodiment of the invention.

In designing a system or other product intended for later use, design criteria including reliability are considered throughout the design process to meet the final customer or other end user perceived or actual reliability, which will be referred to as customer reliability. In order to accurately estimate the customer's perceived reliability, organizational and cultural considerations must be considered at the plurality of phases along the product life cycle (PLC). Among others, the product life cycle includes the "box-of-parts," design, manufacturing, installation/infant mortality, warranty service/customer training, and customer use/planned maintenance. The box-of-parts phase is the point at which individual components or sub-systems are taken into consideration. These can be conventional off the shelf (COTS) items or specially designed components or sub-systems. This level of reliability is based on characteristics of these individual components and sub-systems. At this point the reliability is based upon the nominal reliability of the components or sub-system.

An evaluation of the processes for each phase of the PLC is individually determined. This evaluation process can take many forms. One example commonly performed in the art is to use PRISM process grade factors (PGF). The goal of PGF is to consider the impact of process losses during individual steps along the PLC. The use of PGF is just one way to use the method, and other considerations of process losses are considered within the scope of this invention. These PGFs are then used to modify the failure rate multiplier. The failure rate multiplier is used in determining the actual failure rate of a given product based on the maturity of the processes used to develop, manufacture and service the product. Another computation that is often used in the industry is the MTBF which is the inverse of the failure rate.

As described hereinabove, the failure rate multiplier and/or the MTBF multiplier is computed for the different PLC phases. Each of these phases impacts the failure rate multiplier and/or the MTBF multiplier by further reducing the reliability of the product generally. The calculation of the failure rate multiplier and/or the MTBF multiplier is based on simulating a point in time during the PLC and applying the cumulative effect of the PGFs up to that point in time. This process is repeated until reaching the customer use phase.

In a preferred embodiment, each individual PLC phase is influenced by a different set of PGFs. The PGFs for a design lifecycle phase are selected from a design, system management, and growth category of PGF. The PGFs for a manufacturing lifecycle phase are selected from a manufacturing and parts quality category of PGF. The PGFs for installation and infant mortality lifecycle phase are selected from an infant mortality category of PGF. The PGFs for warranty, field service and customer training lifecycle phase are selected from a "can not duplicate" category of PGF. The PGFs for customer use and planned maintenance lifecycle phases are selected from the induced and wearout category of PGF.

As those persons skilled in the art will appreciate the actual failure rate multiplier and/or MTBF multiplier is not known at any point during the calculation. Thus a normalization of the MTBF multiplier can be performed. In the preferred embodiment, the MTBF multiplier values are normalized such that the box-of-parts MTBF is one (1). A measured reliability standard is then chosen usually based upon the customer perceived reliability. The method is used to calculate the goal to design the product to based on the customer perceived reliability standard. This is performed using the predetermined relationship between the various PLC phases. Thus once the targeted customer MTBF is set the previous phase's MTBF requirements can be calculated. The calculation works backward starting with the customer perceived MTBF requirement and calculating the service MTBF requirement. This can be performed because of the previous calculation of the MTBF multiplier and/or failure rate multiplier.

In accordance with one exemplary embodiment as shown in FIG. 1, at step 101, failure rate multipliers are first calculated for each phase of the PLC (e.g., design, manufacturing, installation/infant mortality, warranty service/customer training, customer use/misuse and planned maintenance). This is carried out by starting with a perfect PGF (which assumes a perfect process) and then applying the effect of the PGFs cumulatively starting with the design phase and ending with the customer use phase (with PGF categories being grouped according to PLC phase). The fail rate reduction at each phase (caused by the addition of the PGFs) then gives the fail rate multiplier for that phase. Then at Step 103, MTBF multipliers are calculated for each PLC phase, by inverting the calculated failure rate multipliers and normalizing so that the "box of parts" MTBF multiplier is 1 (one). At Step 105, the customer perceived reliability target is set. Finally, at Step 107, a new target "box-of-parts" MTBF is determined based on the target customer perceived reliability, by multiplying the customer phase MTBF by the ratio of each phase MTBF multiplier to the customer MTBF multiplier.

A typical and exemplary situation can be seen through the calculation of the required MTBF for service using the ratio of the previously determined service MTBF over the previously determined customer MTBF. This ratio is then multiplied by the required MTBF for the customer to yield the required MTBF for the service phase. In essence, these calculations are performed in order to find the required box-of-parts reliability criteria. It can also be used to inspect the product after manufacture to ensure that the product complies with the MTBF and/or failure rate multiplier up to that point in the PLC. This is useful in product quality control evaluation. This type of manufacturing reliability target can be used for any production reliability acceptance testing or other sequential type testing during production. This is possible because there are no failures based upon servicing the equipment or from customer use of the product.

In the manner described hereinabove, a method for calculating the required box-of-parts MTBF multiplier is possible using a determination of the failure rate multipliers for each of the individual phases of PLC and performing a simulated calculation based on these values plus a box-of-parts standard based on the nominal reliability of the parts. Using a chosen value for the customer perceived MTBF requirement, a calculation using the predetermined relationship between the MTBFs of the various PLC phase and MTBF requirement for the box-of-parts phase can be determined as well as any other PLC phase.

It should be appreciated by those having ordinary skill in the art that while the present invention has been illustrated and described in what is deemed to be the preferred embodiments, various changes and modifications may be made to the invention without departing from the spirit and scope of the invention. Therefore, it should be understood that the present invention is not limited to the particular embodiments disclosed herein.

What is claimed is:

1. A method for determining a mean time between failures (MTBF) value for a repairable product that corresponds to a target customer perceived reliability for the product by accounting for process losses incurred during the product's lifecycle downstream of component part selection, said method comprising:

determining, for each of a plurality of phases of the product's lifecycle, a phase-attributable failure rate multiplier of each of said respective phases, including at least a box-of-parts phase and a customer use phase;

utilizing said phase-attributable failure rate multipliers, calculating a normalized MTBF multiplier for each of said plurality of phases of the product's lifecycle based on a MTBF multiplier that is normalized to unity for said box-of-parts phase; and determining a target box-of-parts MTBF based on the target customer perceived reliability adjusted in consideration of said normalized MTBF multiplier for said customer use phase.

2. The method as recited in claim 1, wherein determining a target box-of-parts MTBF uses a back calculation based on the targeted customer perceived reliability, said back calculation multiplies the target customer perceived reliability by a ratio of the normalized MTBF multiplier of the box-of-parts phase over the normalized MTBF multiplier of the customer use phase to yield the box-of-parts required MTBF.

3. The method as recited in claim 1, wherein said plurality of phases of the product's lifecycle includes, in addition to said box-of-parts phase and said customer use phase, at least one of (i) a design phase, (ii) a manufacturing phase, (iii) an infant mortality phase, and (iv) a warranty service phase.

4. The method as recited in claim 1, wherein said phase-attributable failure rate multipliers, one each for each of said product's lifecycle phases, are calculated based on a difference between an assessed failure rate multiplier associated with the end of the particular phase minus an assessed failure rat multiplier associated with the beginning of that same phase.

5. The method as recited in clam 1, wherein said phase-attributable failure rate multipliers, one each for each of said product's lifecycle phases, are determined based on a change in assessed failure rate multiplier from the beginning to the end of the particular phase.

6. The method as recited in claim 4, wherein each assessed failure rate multiplier is determined by applying process grade factors (PGF) to a normalized box-of-parts reliability.

7. The method as recited in claim 5, wherein said normalized box-of-parts reliability is calculated by applying a perfect set of process grade factors (PGF) to a sample box-of-parts consisting of available constituent components of said repairable product.

8. The method as recited in claim 6, wherein the process grade factors (PGF) applied to any one of said product's lifecycle phases are selected from a category of process grade factors (PGF) corresponding to the particular product's lifecycle phase.

9. The method as recited in claim 7, wherein the process grade factors (PGF) applied to a design lifecycle phase are selected from a design, system management and growth category of process grade factors (PGF) when said design life cycle phase is one of said plurality of phases of the product's lifecycle.

10. The method as recited in claim 7, wherein the process grade factor (PGF) applied to manufacturing lifecycle phase are selected from a manufacturing quality category of process grade factors (PGF) when said manufacturing lifecycle phase is one of said plurality of phases of the product's life cycle.

11. The method as recited in claim 7, wherein the process grade factors (PGF) applied to a manufacturing lifecycle phase are selected from a part quality category of process grade factors (PGF) when said manufacturing lifecycle phase is one of said plurality of phase of the product's lifecycle.

12. The method as recited in claim 7, wherein the process grade factors (PGF) applied to an installation or infant mortality lifecycle phase are selected from an infant mortality category of process grade factors (PGF) when said infant mortality lifecycle phase is one of said plurality of phases of the product's lifecycle.

13. The method as recited in claim 7, wherein the process grade factors (PGF) applied to an warranty service lifecycle phase are selected from a can not duplicate (CND) category of process grade factors (PGF) when said warranty service lifecycle phase is one of said plurality of phases of the product's lifecycle.

14. The method as recited in claim 6, wherein each of said phase-attributable failure rate multipliers is converted to a phase-attributable MTBF multiplier by taking an inverse thereof and then normalizing by division by said MTBF multiplier of said box-of-parts phase.

15. The method as recited in claim 12, wherein said target box-of-parts MTBF is determined by dividing the target customer perceived reliability, expressed in terms of MTBF, by said normalized MTBF multiplier for said customer use phase.

16. A method for determining a mean time between failures (MTBF) value for a repairable product that corresponds to a target customer perceived reliability for the product by accounting for process losses incurred during the product's lifecycle downstream of component part selection, said method comprising:
  determining, for each of a plurality of phases of the product's lifecycle, a phase-attributable failure rate multiplier of each of said respective phase, including at least a box-of-parts phase, manufacturing phase and a customer use phase;
  utilizing said phase-attributable failure rate multipliers, calculating a normalized MTBF multiplier for each of said plurality of phases of the product's lifecycle based on a MTBF multiplier that is normalized to unity for said box-of-parts phase; and
  determining a target manufacturing MTBF based on the target customer perceived reliability adjusted in consideration of said normalized MTBF multiplier for said customer use phase.

17. The method as recited in claim 16, wherein determining a target manufacturing MTBF uses a back calculation based on the targeted customer perceived reliability, said back calculation multiplies the targeted customer perceived reliability by a ratio of the normalized MTBF multiplier of the manufacturing product lifecycle (PLC) phase over the normalized MTBF multiplier of the customer use PLC phase to yield the manufacturing required MTBF.

18. A method for determining a mean time between failures (MTBF) value for a repairable product that corresponds to a target customer perceived reliability for the product by accounting for process losses incurred during the product's lifecycle downstream of component part selection, said method comprising:
  determining, for each of a plurality of phases of the product's lifecycle, a phase-attributable failure rate multiplier of each of said respective phases, including at least a box-of-parts phase, design phase and a customer use phase;
  utilizing said phase-attributable failure rate multipliers, calculating a normalized MTBF multiplier for each of said plurality of phases of the product's lifecycle based on a MTBF multiplier that is normalized to unity for said box-of-parts phase; and
  determining a target design MTBF based on the target customer perceived reliability adjusted in consideration of said normalized MTBF multiplier for said customer use phase.

19. The method as recited in claim 18, wherein determining a target design MTBF uses a back calculation based on the targeted customer perceived reliability, said back calculation multiplies the targeted customer perceived reliability by a ratio of the normalized MTBF multiplier of the design product lifecycle (PLC) phase over the normalized MTBF multiplier of the customer use PLC phase to yield the design required MTBF.

* * * * *